Oct. 24, 1933.  E. BERTRAM  1,931,883
PHOTOGRAPHIC EXPOSURE METER
Filed Aug. 8, 1930   2 Sheets-Sheet 1
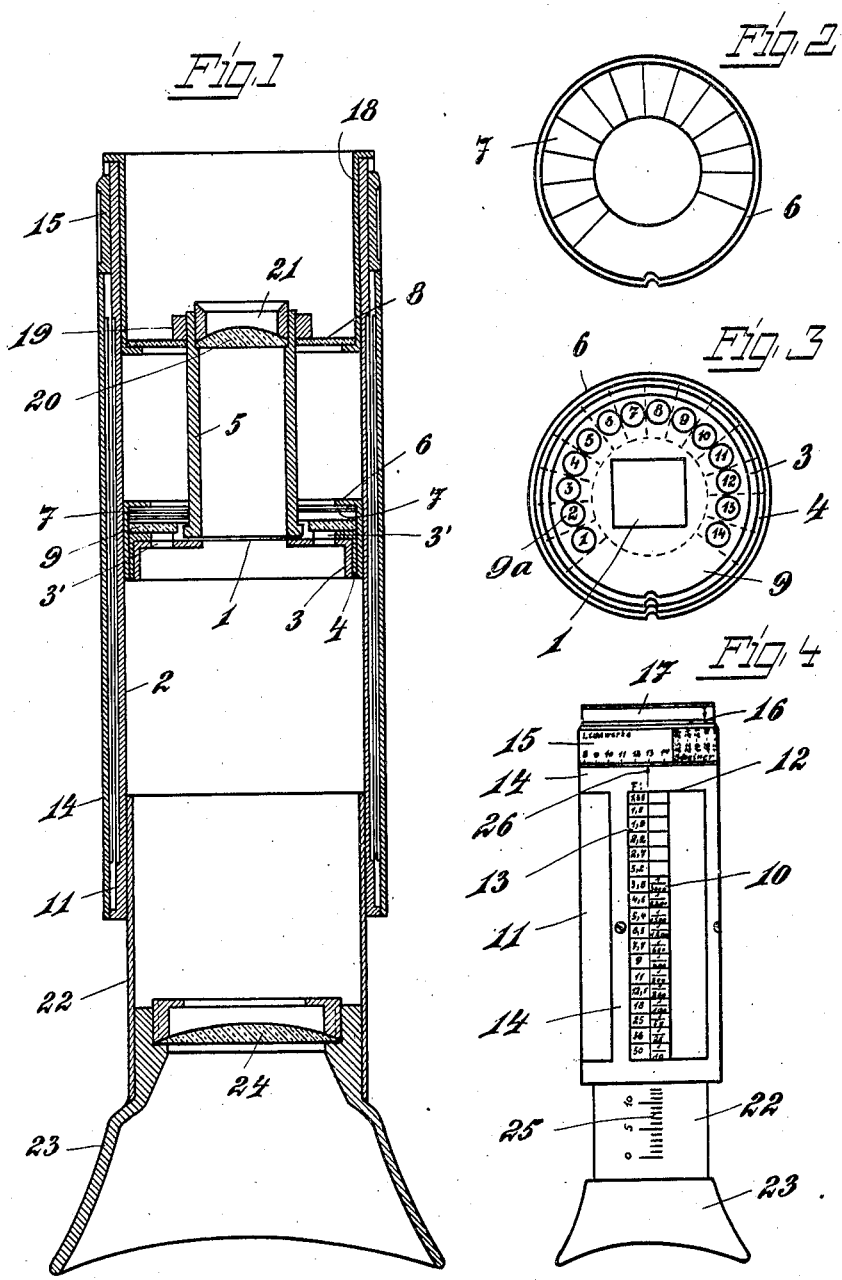
ERNST BERTRAM
INVENTOR:
By Otto Munk
his Attorney.

Oct. 24, 1933.  E. BERTRAM  1,931,883
PHOTOGRAPHIC EXPOSURE METER
Filed Aug. 8, 1930  2 Sheets-Sheet 2
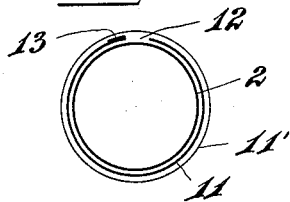
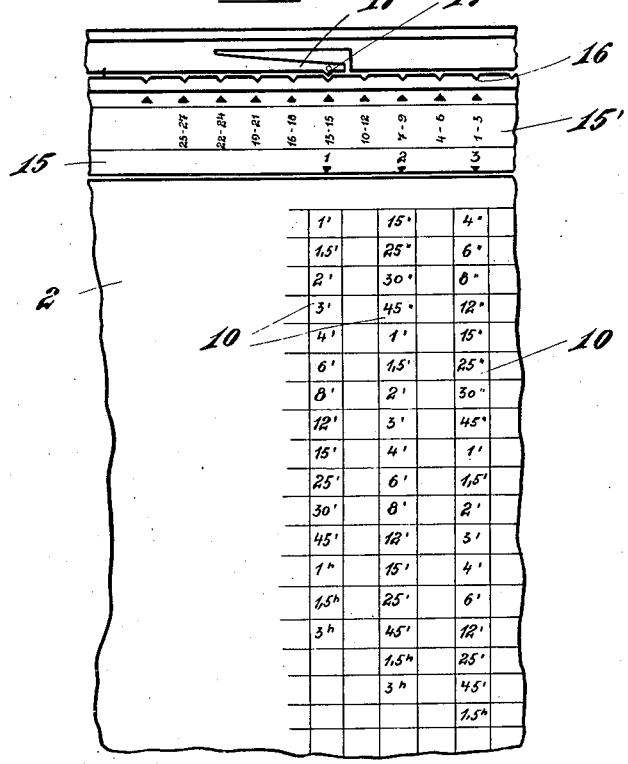
ERNST BERTRAM
INVENTOR;
By Otto Munk
his Attorney.

Patented Oct. 24, 1933

1,931,883

UNITED STATES PATENT OFFICE 1,931,883

PHOTOGRAPHIC EXPOSURE-METER

Ernst Bertram, Pasing, near Munich, Germany

Application August 8, 1930, Serial No. 474,023, and in Germany August 20, 1929

3 Claims. (Cl. 88—23)

The invention relates to a photographic exposure-meter which makes a quick, simple and faultless ascertainment of the time of exposure possible.

According to the invention a rotary cylinder having a longitudinal slot rests on the measuring tube which contains the optics and on which the series of times of exposure corresponding to the individual light values are arranged. This cylinder is provided with a series of graduations in proximity to the slot, so that on adjusting a mark of the rotary cylinder to the light value ascertained, only the series of exposure times corresponding to the said light value is visible next to the series of graduations, whilst all the remaining series of exposure times are hidden by the cylinder.

The invention is illustratively exemplified in the accompanying drawings, in which Figure 1 shows the exposure-meter in axial section and on an enlarged scale, Fig. 2 shows one of the devices for measuring the light, Fig. 3 shows the transparent disc arranged in front of the device for measuring the light, Fig. 4 is a front view of the instrument, Fig. 5 is a cross section of the measuring tube and of the cylinder turning on the latter, and Fig. 6 is a development of the measuring tube enlarged.

The invention consists substantially of a small photographic chamber, the ground glass 1 of which is enclosed by the measuring tube 2 and lies between two rings 3 and 4 angular in cross section. For three fourths of their circumference the rings are provided with a number of holes 3'. In the outer ring 4 the lens-tube 5 is fixed. The measuring tube 2 contains an additional ring 6 carrying the device proper for measuring the light. This device consists of small white, transparent sheets 7, superposed in offset relation. The sheets are all made of the same material; the graduation in transparency is attained by the gradual increase in the number of the superimposed sheets; the transparency is calculated in such a way that the next degree always indicates double the exposure. The light passes from the object to be photographed through a ground glass 8 to the sheets 7. The superimposed sheets are covered by a transparent light-disc 9 made of glass or celluloid on which the light values 9a are printed, engraved or etched, on a scale bearing numbers 1—14. The disc 9 is arranged so that one of the numbers of the light values is always adjacent a sheet 7 and a hole 3'. The two rings 3 and 4 with the ground glass 1 and the lens-tube 5 hold the light value disc 9 and the sheets 7 together and are arranged in such a manner that the holes 3' register exactly with the light values 9a and the sheets 7.

On the outer surface of the measuring tube 2 the series 10 of exposure times corresponding to the light values are indicated, as may be seen from Fig. 6. On the measuring tube 2 is a rotary cylinder 11 having a longitudinal slot 12 the width and length of which correspond to the width and length of the series of number 10. Along the edge of the slot 12 a series of graduations 13 is arranged on this cylinder, and the cylinder 11 also carries a table for ascertaining the longest admissible time of exposure of moved objects as well as a short direction for use of the exposure-meter. These tables and the directions for use are not shown in the drawings for simplicity's sake. As a protection against atmospheric influences the cylinder 11 is enclosed by a protective transparent casing 11'. This protective casing is supported by a sectional ribbed tube 14, fixed to the tube 11 in such a manner that the above mentioned written matter fills out the empty spaces.

On a ring 15 the same light values are arranged in the form of a scale bearing numbers 1—14 as on the disc of light-values 9. As may be seen from Fig. 6, the spacing of the light value numbers of the ring 15 corresponds to the spacing of the series 10 of exposure times on tube 2. On the scale-ring 15 there are indicated on the strip 15' the degrees of sensitivity of the plate emulsion expressed in degrees. The rotary scale-ring 15 rests on the measuring tube 2 and is provided with notches 16 engageable by a nose 17' of a spring-ring 17 fixed to the measuring tube 2 which prevents inadvertent displacement of the scale-ring 15 after adjustment for the sensitivity of plate emulsion.

As a cover a flanged socket 18 is introduced in the main tube 2. Resting on the flange of the socket 18 is the ground glass 8 enclosed by the lens-tube 5 and kept in position by a nut 19. In the lens-tube 5 a small collecting lens 20 is fastened by a ring 21.

The magnifying tube 22 receives the flared cap 23 in which the magnifying lens 24 is fastened.

The measuring of the light is effected in the following manner:

1. The scale-ring 15 is adjusted by turning to the degree of sensitivity of the plate used; this adjustment is complete when the nose 17' of the spring-ring 17 engages the rest 16 corresponding to the degree of sensitivity.

2. The cap 23 is then placed well into the eye, so that no side-light enters, and the ring of numbers 9a is adjusted minutely by displacement of the magnifying tube 22. This adjustment should be noted on a scale 25 of the tube 22; with all further measuring by the same eye all that is necessary is to adjust the magnifying tube 22 to the same line-mark of the scale 25.

3. Now the object appearing on the blue ground glass 1 is sighted; then the series 9a of light values is read up to that number which is clearly legible without straining the eye; and this number should be noted.

4. Now the cylinder 11 is adjusted with its arrow mark 26 to the same number of the scale-ring 15 which on measuring has been found to be clearly legible. After this adjustment of the cylinder 11 all the series 10 of exposure times are hidden with the exception of that corresponding to the number of light-value adjusted (according to Fig. 4 for instance the number "13"). This series of exposure times is visible through the longitudinal slot 12 of the cylinder 11. Now, among the series of graduations 13 arranged on the cylinder 11 the graduation used for taking the photo is sought and then there is found at the side the time of exposure sought.

What I claim is:

1. An exposure meter comprising a tube, a transparent disc in said tube comprising a plurality of fields of different density, and a central bore, a second transparent disc contacting with the first disc and carrying a plurality of characters upon its surface, each thereof registering with one of the said fields, a second tube provided with a magnifying glass and adjustably connected to said first tube, an exposure time scale attached to the outside of the said first tube, a third tube provided with a slot rotatably mounted upon said first tube, a diaphragm scale disposed along said slot, a fourth tube rotatably mounted upon the said third tube and carrying a scale with the characters provided on the said second disc, and a second scale with values of the plate sensitiveness, the proper exposure time being found by ascertaining the correct field and its character by looking through the magnifying glass and then accordingly adjusting the scales by rotation of the several tubes.

2. A device, as claimed in claim 1, in which said first disc consists of a plurality of white transparent leaves stepwise superimposed to form a plurality of shaded fields, each preceding field having a transparency corresponding to one-half of the exposure time which corresponds to the transparency of the next following field.

3. An exposure meter, as claimed in claim 1, comprising a perforated ring in the said first tube, said perforations registering with the different fields of said first disc, a ground glass carried by said ring, a second ring member for holding the said two discs and the ground glass upon the first ring, a tubular casing centered upon said ground glass, a lens carried by said casing, a support for securing said casing to the tube and a second ground glass surrounding the casing and being attached to the said support, the lens casing and first ground glass serving for sighting purposes.

ERNST BERTRAM.